US010883023B2

(12) United States Patent
Zhang-Watson et al.

(10) Patent No.: US 10,883,023 B2
(45) Date of Patent: Jan. 5, 2021

(54) ADHESIVE COMPOSITION

(71) Applicant: Dow Global Technologies LLC, Midland, MI (US)

(72) Inventors: Ling Zhang-Watson, Freeport, TX (US); Yi Jin, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 200 days.

(21) Appl. No.: 16/305,245

(22) PCT Filed: Jun. 2, 2017

(86) PCT No.: PCT/US2017/035593
§ 371 (c)(1),
(2) Date: Nov. 28, 2018

(87) PCT Pub. No.: WO2017/210507
PCT Pub. Date: Dec. 7, 2017

(65) Prior Publication Data
US 2020/0317966 A1 Oct. 8, 2020

Related U.S. Application Data

(60) Provisional application No. 62/345,433, filed on Jun. 3, 2016.

(51) Int. Cl.
*C08L 23/06* (2006.01)
*C09J 123/14* (2006.01)
*C08L 23/14* (2006.01)

(52) U.S. Cl.
CPC .......... *C09J 123/142* (2013.01); *C08L 23/142* (2013.01); *C08L 2205/04* (2013.01)

(58) Field of Classification Search
CPC .................... C09J 123/142; C09J 123/06
See application file for complete search history.

(56) References Cited

U.S. PATENT DOCUMENTS

| | | | |
|---|---|---|---|
| 7,794,847 B2* | 9/2010 | Chasey | C08K 3/14 428/500 |
| 8,431,642 B2 | 4/2013 | Tancrede et al. | |
| 8,536,268 B2 | 9/2013 | Karjala et al. | |
| 9,650,505 B2* | 5/2017 | Fantinel | C08L 23/16 |
| 10,023,771 B2* | 7/2018 | Jin | C08K 5/0083 |
| 10,155,889 B2* | 12/2018 | Jin | C08L 23/06 |
| 2010/0305259 A1* | 12/2010 | Rodriguez | C09J 123/10 524/504 |
| 2012/0244327 A1* | 9/2012 | Hernandez | B32B 27/36 428/213 |
| 2013/0060215 A1 | 3/2013 | Knutson et al. | |
| 2014/0221559 A1* | 8/2014 | Weeks | C08L 23/0815 524/528 |
| 2015/0166850 A1* | 6/2015 | Tse | C09J 123/06 524/528 |
| 2015/0315429 A1 | 11/2015 | McLennaghan | |
| 2016/0130480 A1* | 5/2016 | Kauffman | B32B 5/22 428/36.1 |
| 2017/0240784 A1* | 8/2017 | Jin | C08L 91/06 |

FOREIGN PATENT DOCUMENTS

| | | |
|---|---|---|
| EP | 2327750 B1 | 3/2013 |
| WO | 2010/138253 A2 | 12/2010 |
| WO | 2012/149391 A1 | 11/2012 |
| WO | 2014/046834 A1 | 3/2014 |
| WO | 2014/163758 A1 | 10/2014 |
| WO | 2015/102989 A1 | 7/2015 |
| WO | 2016/028970 A1 | 2/2016 |
| WO | 2016/029006 A1 | 2/2016 |
| WO | 2016/029012 A1 | 2/2016 |

* cited by examiner

Primary Examiner — Michael M Dollinger
(74) Attorney, Agent, or Firm — Quarles & Brady LLP

(57) ABSTRACT

The present disclosure provides a composition. In an embodiment an adhesive composition is provided and includes (A) a propylene-based interpolymer having a density from 0.850 g/cc to 0.900 g/cc; (B) an ethylene-based polymer composition having a melt viscosity at 140° C. from 10 mPa*s to 1,000 mPa*s; and (C) a tackifier. The composition has a molecular weight distribution ratio from 1.00 to 1.40, wherein the molecular weight distribution ratio is the molecular weight distribution of the propylene-based interpolymer of component (A) compared to the molecular weight distribution of the ethylene-based polymer composition of component (B). The composition has a density ratio from 0.93 to 1.30, wherein the density ratio is the density of the propylene-based interpolymer of component (A) compared to the density of the ethylene-based polymer composition of component (B).

10 Claims, No Drawings

ADHESIVE COMPOSITION

REFERENCE TO RELATED APPLICATIONS

This application claims the benefit of U.S. Provisional Application No. 62/345,433, filed Jun. 3, 2016, and incorporated herein by reference.

BACKGROUND

Compositions for conventional hot-melt adhesive (HMA) formulations follow a general rule of thumb of containing 1/3 polymer, 1/3 tackifier and 1/3 wax. An HMA formulation using propylene-based polymer can be formulated into an HMA formulation with sufficient adhesion performance, but propylene-based polymers are less compatible with conventional ethylene-based waxes and Fischer-Tropsch waxes, which often results in failure of adhesion performance. HMA formulations using propylene-based polymers conventionally include a propylene-based wax to overcome the compatibility issues. However, propylene-based waxes are more expensive than conventional ethylene-based waxes and typically result in longer set times. Known are HMA compositions including propylene-based polymer and high density (i.e., at least 0.950 g/cc) ethylene-based wax. The high density limits the selection of ethylene-based wax that is suitable for HMA compositions.

A need exists for a HMA composition with a propylene-based polymer and a low density ethylene-based wax, while maintaining suitable adhesion properties and a rapid set time compatible with high-speed line processing applications.

A need further exists for a HMA composition with a propylene-based polymer and a low density ethylene-based wax having improved high temperature resistance, improved adhesion properties, improved substrate compatibility, and/or improved thermal stability.

SUMMARY

The instant disclosure provides a composition suitable for adhesive applications, and further for holt-melt adhesive applications.

The present composition provides a composition. In an embodiment, an adhesive composition is provided and includes (A) a propylene-based interpolymer having a density from 0.850 g/cc to 0.900 g/cc; (B) an ethylene-based polymer composition having a melt viscosity at 140° C. from 10 mPa·s to 1,000 mPa·s; and (C) a tackifier. The composition has a molecular weight distribution ratio from 1.00 to 1.40, wherein the molecular weight distribution ratio is the molecular weight distribution of the propylene-based interpolymer of component (A) compared to the molecular weight distribution of the ethylene-based polymer composition of component (B). The composition has a density ratio from 0.93 to 1.30, wherein the density ratio is the density of the propylene-based interpolymer of component (A) compared to the density of the ethylene-based polymer composition of component (B).

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., or 2; or 3 to 5; or 6; or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," as defined hereinafter. Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

An "interpolymer" is a polymer prepared by the polymerization of at least two different types of monomers. The generic term interpolymer thus includes copolymers (employed to refer to polymers prepared from two different types of monomers), and polymers prepared from more than two different types of monomers.

An "olefin-based polymer" or "polyolefin" is a polymer that contains equal to or greater than 50 wt %, or a majority amount of polymerized olefin monomer, for example, ethylene or propylene, (based on the weight of the polymer), and optionally, may contain at least one comonomer. Nonlimiting examples of an olefin-based polymer include an ethylene-based polymer and a propylene-based polymer.

An "ethylene-based polymer" or "ethylene polymer" is a polymer that contains equal to or greater than 50 wt %, or a majority amount of polymerized ethylene based on the weight of the polymer, and, optionally, may comprise at least one comonomer.

A "propylene-based polymer" is a polymer that contains equal to or greater than 50 wt %, or a majority amount of polymerized propylene based on the weight of the polymer, and, optionally, may comprise at least one comonomer.

An "ethylene/α-olefin interpolymer" is an interpolymer that contains a majority amount of polymerized ethylene, based on the weight of the interpolymer, and at least one α-olefin.

An "ethylene/α-olefin copolymer" is an interpolymer that contains greater than 50 wt %, or a majority amount of polymerized ethylene, based on the weight of the copolymer, and an α-olefin, as the only two monomer types.

A "propylene-based interpolymer" is an interpolymer that contains, in polymerized form, equal to or greater than 50 wt %, or a majority amount of propylene, based on the weight of the interpolymer, and at least one comonomer.

A "propylene/α-olefin interpolymer" is an interpolymer that contains, in polymerized form, equal to or greater than 50 wt %, or a majority amount of propylene, based on the weight of the interpolymer, and at least one α-olefin.

A "propylene/α-olefin copolymer" is a copolymer that contains, in polymerized form, greater than 50 wt % propylene, based on the weight of the copolymer, and an α-olefin, as the only two monomer types.

DETAILED DESCRIPTION

The instant disclosure provides a composition suitable for holt-melt adhesive applications. The composition includes:
(A) a propylene-based interpolymer having a density from 0.850 g/cc to 0.900 g/cc;
(B) an ethylene-based polymer composition having a melt viscosity at 140° C. from 10 mPa·s to 1,000 mPa·s; and
(C) a tackifier; and
(D) optional antioxidant, and
the composition has (i) a molecular weight distribution ratio from 1.00 to 1.40, wherein the molecular weight distribution ratio is the molecular weight distribution of the propylene-based interpolymer of component (A) compared to the molecular weight distribution of the ethylene-based polymer composition of component (B); and (ii) a density ratio from 0.93 to 1.30, wherein the density ratio is the density of the propylene-based interpolymer of component (A) compared to the density of the ethylene-based polymer composition of component (B).

In an embodiment, the composition is an adhesive composition, or further a hot melt adhesive (HMA) composition. An "adhesive composition" is a mixture of components that is capable of joining substrates of interest together under an application of heat and/or pressure. A nonlimiting example of a suitable adhesive composition is a hot melt adhesive (HMA) composition. A "hot melt adhesive (HMA) composition" is a mixture of components that is capable of joining substrates of interest together under the application of heat, or more typically, the application of heat and pressure. In an embodiment, the composition is a HMA composition. Although the following disclosure is directed to HMA compositions, it is understood that the following disclosure is applicable to other adhesive compositions, such as pressure sensitive adhesive compositions, for example.

A. Propylene-Based Interpolymer

The present composition includes a propylene-based interpolymer.

In an embodiment, the propylene-based interpolymer is selected from a propylene/α-olefin interpolymer, or a propylene/α-olefin copolymer. Nonlimiting examples of suitable α-olefins include, for example, ethylene, $C_4$, $C_5$, $C_6$ and $C_8$ α-olefins. In an embodiment, the propylene-based interpolymer is selected from a propylene/ethylene interpolymer, or a propylene/ethylene copolymer. In an embodiment, the propylene-based interpolymer is a propylene-based plastomer or elastomer (or "PBPE").

In an embodiment, the propylene-based interpolymer contains greater than 50 wt % units derived from propylene, or from 51 wt %, or 55 wt %, or 60 wt %, or 65 wt % to 70 wt %, or 75 wt %, or 80 wt %, or 85 wt %, or 90 wt %, or 95 wt %, or 98 wt %, or 99 wt % units derived from propylene, based on the weight of the propylene-based interpolymer.

In an embodiment, the propylene-based interpolymer is a propylene-based plastomer or elastomer. A "propylene-based plastomer or elastomer" (or "PBPE") is a propylene/ethylene copolymer and includes at least 50 weight percent of units derived from propylene and up to 10 wt % ethylene comonomer. In an embodiment, PBPE includes from 1 wt %, or 3 wt %, or 4 wt %, or 5 wt % to 7 wt %, or 8 wt %, or 9 wt %, or 10 wt % ethylene comonomer. In an embodiment, the PBPE includes from 50 wt %, or 60 wt %, or 70 wt %, or 80 wt %, or 90 wt %, or 91 wt %, or 92 wt %, or 93 wt % to 95 wt %, or 96 wt %, or 97 wt %, or 98 wt %, or 99 wt % propylene comonomer. In an embodiment, the PBPE includes greater than 50 wt % propylene comonomer. In another embodiment, the PBPE includes from 90 wt %, or 91 wt %, or 92 wt %, or 93 wt %, or 94 wt % to 95 wt %, or 96 wt %, or 97 wt %, or 98 wt %, or 99 wt % units derived from propylene and from 1 wt %, or 2 wt %, or 3 wt %, or 4 wt %, or 5 wt % to 6 wt %, or 7 wt %, or 8 wt %, or 9 wt %, or 10 wt % units derived from ethylene.

In an embodiment, the propylene-based interpolymer has a total unsaturation per mole of propylene from 0.010%, or 0.015% to 0.025%, or 0.030%. The total unsaturation per mole of propylene is measured by $^1H$ NMR analysis, as described below in the test methods section. In a further embodiment, the propylene-based interpolymer is a propylene/α-olefin interpolymer, and further a propylene/α-olefin copolymer, and further a PBPE. Nonlimiting examples of suitable α-olefins include, for example, ethylene, $C_4$, $C_5$, $C_6$ and $C_8$ α-olefins.

In an embodiment, the propylene-based interpolymer has a melt viscosity at 177° C. from 700 milliPascal-second (mPa·s), or 800 mPa·s, or 900 mPa·s, or 1,000 mPa·s, or 1,500 mPa·s to 2,000 mPa·s, or 2,500 mPa·s, or 4,000 mPa·s, or 5,000 mPa·s, or 7,000 mPa·s, or 10,000 mPa·s. In a further embodiment, the propylene-based interpolymer has a melt viscosity at 177° C. from 700 mPa·s to 5,000 mPa·s. In a further embodiment, the propylene-based interpolymer is a propylene/α-olefin interpolymer, and further a propylene/α-olefin copolymer, and further a PBPE. Nonlimiting examples of suitable α-olefins include, for example, ethylene, $C_4$, $C_5$, $C_6$ and $C_8$ α-olefins.

In an embodiment, the propylene-based interpolymer has a crystallinity from 1 wt %, or 10 wt %, or 15 wt %, or 20 wt % to 25 wt %, or 30 wt %, or 35 wt %, or 40 wt %. In an embodiment, the propylene-based interpolymer has a crystallinity from 10 to 40 wt %, or 20 to 39 wt %. In an embodiment, a PBPE that is propylene/ethylene copolymer may have a crystallinity in the range from 10 to 40 wt %, or 20 to 39 wt %. Crystallinity is measured via DSC method, as described below in the test methods section. In a further embodiment, the propylene-based interpolymer is a propylene/α-olefin interpolymer, and further a propylene/α-olefin copolymer, and further a PBPE. The propylene/ethylene copolymer includes units derived from propylene and polymeric units derived from ethylene comonomer and optional $C_4$-$C_{10}$ α-olefin. Nonlimiting examples of suitable α-olefins include, for example, ethylene, $C_4$, $C_5$, $C_6$ and $C_8$ α-olefins.

In an embodiment, the propylene-based interpolymer has a heat of fusion ($H_f$) from 40 J/g, or 45 J/g to 50 J/g, or 55 J/g, or 60 J/g, or 65 J/g, or 70 J/g, or 75 J/g, or 80 J/g. In a further embodiment, the propylene-based interpolymer is a propylene/α-olefin interpolymer, and further a propylene/α-olefin copolymer, and further a PBPE. Nonlimiting examples of suitable C-olefins include, for example, ethylene, $C_4$, $C_5$, $C_6$ and $C_8$ α-olefins.

In an embodiment, the propylene-based interpolymer has a density from 0.850 g/cc, or 0.860 g/cc, or 0.865 g/cc, or 0.870 g/cc to 0.880 g/cc, or 0.885 g/cc, or 0.890 g/cc. In a further embodiment, the propylene-based interpolymer is a propylene/α-olefin interpolymer, and further a propylene/α-olefin copolymer, and further a PBPE. Nonlimiting examples of suitable α-olefins include, for example, ethylene, $C_4$, $C_5$, and $C_6$ α-olefins.

In an embodiment, the propylene-based interpolymer has a melting temperature, Tm, from 85° C., or 90° C., or 95° C., or 100° C. to 105° C., or 110° C., or 115° C., or 120° C. In a further embodiment, the propylene-based interpolymer is a propylene/α-olefin interpolymer, and further a propylene/α-olefin copolymer, and further a PBPE. Nonlimiting examples of suitable α-olefins include, for example, ethylene, $C_4$, $C_5$, $C_6$ and $C_8$ α-olefins.

In an embodiment, the propylene-based interpolymer has a weight average molecular weight (Mw) from 20,000 g/mol, or 24,000 g/mol, or 30,000 g/mol to 35,000 g/mol, or 40,000 g/mol, or 48,000 g/mol, or 50,000 g/mol. In a further embodiment, the propylene-based interpolymer is a propylene/α-olefin interpolymer, and further a propylene/α-olefin copolymer, and further a PBPE. Nonlimiting examples of suitable α-olefins include, for example, ethylene, $C_4$, $C_5$, $C_6$ and $C_8$ α-olefins.

In an embodiment, the propylene-based interpolymer has a Mw/Mn from 2.0, or 2.1, or 2.2, or 2.3 to 2.5, or 2.7, or 3.0, or 3.5, or 4.0. In a further embodiment, the propylene-based interpolymer is a propylene/α-olefin interpolymer, and further a propylene/α-olefin copolymer, and further a PBPE. Nonlimiting examples of suitable α-olefins include, for example, ethylene, $C_4$, $C_5$, $C_6$ and $C_8$ α-olefins.

In an embodiment, the propylene-based interpolymer has a Mw/Mn from 2.00, or 2.05, or 2.10, or 2.15, or 2.20, or 2.25, or 2.30, or 2.35, or 2.40 to 2.50, or 2.55, or 2.60, or 2.65, or 2.70, or 2.75, or 2.80, or 2.85, or 2.90, or 2.95, or 3.00, or 3.10, or 3.20, or 3.30, or 3.40, or 3.50, or 3.60, or 3.70, or 3.80, or 3.90 or 4.00. In a further embodiment, the propylene-based interpolymer is a propylene/α-olefin interpolymer, and further a propylene/α-olefin copolymer, and further a PBPE. Nonlimiting examples of suitable α-olefins include, for example, ethylene, $C_4$, $C_5$, $C_6$ and $C_8$ α-olefins.

In an embodiment, the propylene-based interpolymer, further the propylene/ethylene interpolymer, further the propylene/ethylene copolymer, and further the PBPE, is characterized as having substantially isotactic propylene sequences. "Substantially isotactic propylene sequences" are sequences having an isotactic triad (mm) measured by $^{13}C$ NMR of greater than 0.85, or greater than 0.90, or greater than 0.92, or greater than 0.93. Isotactic triads refer to the isotactic sequence in terms of a triad unit in the copolymer molecular chain determined by $^{13}C$ NMR spectroscopy.

1. B-Value

The term "B-value" is a measure of randomness and measures the distribution of the propylene and comonomer across the polymer chain of the propylene-based interpolymer. For a propylene/ethylene copolymer, the "B-value" is a measure of randomness and measures the distribution of the propylene and ethylene across the polymer chain of the propylene/ethylene copolymer. B-values range from 0 to 2. The higher the B-value, the more alternating the ethylene distribution in the copolymer. The lower the B-value, the more blocky or clustered the ethylene distribution in the propylene/ethylene copolymer.

In an embodiment, the propylene-based interpolymer has a B-value of less than 1.0, or less than 0.99, or less than 0.98, or less than 0.97. In an embodiment, the propylene-based interpolymer has a B-value from 0.90, or 0.92, or 0.93, or 0.94 to 0.95, or 0.96, or 0.97, or 0.98, or 0.99. In a further embodiment, the propylene-based interpolymer is a propylene/α-olefin interpolymer and further propylene/α-olefin copolymer. Nonlimiting examples of suitable α-olefins include, for example, ethylene, $C_4$, $C_5$, $C_6$ and $C_8$ α-olefins.

In an embodiment, the propylene-based interpolymer is a PBPE with a Koenig B-value of less than 1.0, or less than 0.99, or less than 0.98, or less than 0.97. The lower the B-value, the more blocky or clustered the ethylene distribution in a PBPE propylene/ethylene copolymer. For PBPE polymers made with a Group IV metal complex of a polyvalent aryloxyether catalyst, the B-values are less than 1.0. In an embodiment, the PBPE has a B-value from 0.90, or 0.92, or 0.93, or 0.94 to 0.95, or 0.96, or 0.97, or 0.98, or 0.99. Thus, for PBPE made with the Group IV metal complex of a polyvalent aryloxyether catalyst, not only is the propylene block length relatively long for a given percentage of ethylene, but a substantial amount of long sequences of three or more sequential ethylene insertions are present in the PBPE.

The B-value as described by Koenig (*Spectroscopy of Polymers* (2d ed. 1999) is calculated as follows. B is defined for a propylene/ethylene copolymer as:

$$B = \frac{f(EP + PE)}{2 \cdot FE \cdot FP},$$

where f(EP+PE) the sum of the EP and PE diad fractions; and Fe and Fp=the mole fraction of ethylene and propylene in the copolymer, respectively. The diad fraction can be derived from triad data according to: f(EP+PE)=[EPE]+[EPP+PPE]/2+[PEP]+[EEP+PFE]/2. The B-values can be calculated for other copolymers in an analogous manner by assignment of the respective copolymer diads. For example, calculation of the B-value for a propylene/1-octene copolymer uses the following equation:

$$B = \frac{f(OP + PO)}{2 \cdot FO \cdot FP}.$$

In an embodiment, the propylene-based interpolymer, and further e PBPE has one, some, or all of the following properties: (i) from 90 wt % to 99 wt % units derived from propylene and from 10 wt % to 1 wt % units derived from ethylene; (ii) an isotactic triad (mm) measured by $^{13}$C NMR greater than 0.85; (iii) a Koenig B-value from 0.90 to 0.99; (iv) a total mol % unsaturation propylene from 0.010% to 0.030%; (iii) a density from 0.850 g/cc to 0.890 g/cc; (iv) a melt viscosity at 177° C. from 700 mPa·s to 10,000 mPa·s; (v) a melting temperature, Tm from 85° C. to 120° C.; (vi) a heat of fusion (H$_f$) from 40 J/g to 80 J/g; (vii) a crystallinity from 1% to 40%; (viii) an Mw from 20,000 to 50,000 g/mol; and/or (ix) a Mw/Mn from 2.0 to 4.0.

In an embodiment, the propylene-based interpolymer, and further the PBPE has one, some, or all of the following properties: (i) from 93 wt % to 95 wt % units derived from propylene and from 5 wt % to 7 wt % units derived from ethylene; (ii) an isotactic triad (mm) measured by $^{13}$C NMR greater than 0.90; (iii) a Koenig B-value from 0.90 to 0.96; (iv) a total mol % unsaturation propylene from 0.010% to 0.020%; (iii) a density from 0.870 g/cc to 0.890 g/cc; (iv) a melt viscosity at 177° C. from 700 mPa·s to 5,000 mPa·s; (v) a melting temperature, Tm from 90° C. to 110° C.; (vi) a heat of fusion (H$_f$) from 40 J/g to 70 J/g; (vii) a crystallinity from 20% to 40%; (viii) an Mw from 20,000 to 40,000 g/mol; and/or (ix) a Mw/Mn from 2.0 to 3.0.

2. Suitable Catalyst for the Propylene-Based Interpolymer

In an embodiment, the propylene-based interpolymer, further the propylene/ethylene interpolymer, further the propylene/ethylene copolymer, and further the PBPE, is made with a (i) catalyst that is a Group IV metal complex of a polyvalent aryloxyether, (ii) an activator, and/or (iii) a cocatalyst. The catalyst is capable of producing polymers from propylene containing monomer mixtures having extremely high molecular weight and isotacticity, at catalyst efficiencies of greater than 0.5 $g_{polymer}/\mu g_{metal}$, allowing the use of a chain transfer agent to control molecular weight without sacrificing molecular weight distribution. A sufficient quantity of chain transfer agent is used so that a substantial decrease in molecular weight (>30 percent) occurs compared to a comparative polymerization without the use of chain transfer agent. When the chain transfer agent is hydrogen, at least 0.01 mol percent (based on propylene) is used, and a maximum of 2 mole percent is used. Nonlimiting examples of suitable Group IV metals include titanium, zirconium, and hafnium. In an embodiment, the Group IV metal complex is a hafnium-based polyvalent aryloxyether. A nonlimiting example of a suitable Group IV metal complex of a polyvalent aryloxyether includes [[2',2'''-[1,3-propanediylbis(oxy-κO]bis-{3-9H-3,6-di-(1,1-dimethylethyl)-carbazol-9-yl]}-5'-fluoro-5-(1,1,3,3-tetramethylbutyl)-[1,1'-biphenyl]-2-olato-κO]](2-)]dimethyl hafnium.

The metal complexes are activated in various ways to yield catalyst compounds having a vacant coordination site that will coordinate, insert, and polymerize addition polymerizable monomers, especially olefin(s). For the purposes of this patent specification and appended claims, an "activator" or "cocatalyst" is any compound or component or method which can activate the metal complex in the foregoing manner. Non-limiting examples of suitable activators include Lewis acids, non-coordinating ionic activators, ionizing activators, organometallic compounds, and combinations of the foregoing substances capable of converting the neutral metal complex to a catalytically active species.

Ionizing cocatalysts may contain an active proton, or some other cation associated with, but not coordinated to or only loosely coordinated to, an anion of the ionizing compound. Nonlimiting examples include ammonium cation containing salts, especially those containing trihydrocarbyl-substituted ammonium cations containing one or two $C_{10-40}$alkyl groups, especially methylbis(octodecyl)-ammonium- and methylbis(tetradecyl)-ammonium-cations and a non-coordinating anion, especially a tetrakis(perfluoro)arylborate anion, especially tetrakis(pentafluorophenyl)borate. The cation may comprise a mixture of hydrocarbyl groups of differing lengths. For example, the protonated ammonium cation derived from the commercially available long-chain amine comprising a mixture of two $C_{14}$, $C_{16}$ or $C_{18}$ alkyl groups and one methyl group. Such amines are available from Chemtura Corp., under the trade name Kemamine™ T9701, and from Akzo Nobel under the trade name Armeen™ M2HT. In an embodiment, the ammonium salt activator is methyl di($C_{14-20}$ alkyl)ammonium tetrakis(pentafluorophenyl)borate, such as methyl di(octadecyl)ammonium tetrakis(pentafluorophenyl)borate (MDB).

Another suitable class of organometallic activators or cocatalysts is alumoxanes, also referred to as alkylaluminoxanes. Alumoxanes are well known activators for use with metallocene type catalyst compounds to prepare addition polymerization catalysts. Nonlimiting examples include alumoxanes that are Lewis acid modified alumoxanes, especially tri($C_{3-6}$)alkylaluminum modified methylalumoxane, including tri(isobutyl)aluminum modified methalumoxane (MMAO), available commercially as MMAO-3A, from Akzo Nobel, or tri(n-octyl)aluminum modified methalumoxane, available commercially as MMAO-12, from Akzo Nobel.

Combinations of activators are also contemplated by the present disclosure, for example, alumoxanes and ionizing activators in combination.

In an embodiment, the propylene-based interpolymer, further the propylene/α-olefin interpolymer, further the propylene/α-olefin copolymer, and further the PBPE is produced as disclosed in International Application Number PCT/US2015/046094 filed 20 Aug. 2015 (published as International Publication No. WO 2016/029006) or co-pending application U.S. Ser. No. 62/235,185 filed 30 Sep. 2015, the entire content of each is incorporated by reference herein to the extent that the language is not inconsistent with the instant application.

The propylene-based interpolymer, and further the propylene/α-olefin copolymer, and further the PBPE, is present in the composition in an amount from 50 wt %, or 51 wt %, or 55 wt %, or 60 wt %, or 65 wt %, or 69 wt % to 70 wt %, or 71 wt %, or 75 wt %, or 80 wt %, or 85 wt %, or 90 wt %. In an embodiment, the PBPE is present in the composition in an amount that is equal to or greater than 50 wt %. Weight percent is based on total weight of the composition.

The propylene-based interpolymer, further the propylene/α-olefin interpolymer, further the propylene/6-olefin copolymer, and further the PBPE, may comprise two or more embodiments disclosed herein.

B. Ethylene-Based Polymer Composition

The present composition includes an ethylene-based polymer composition. The ethylene-based polymer composition may be used to reduce the melt viscosity of the HMA composition. An "ethylene-based polymer composition" includes an ethylene-based polymer or a blend of ethylene-based polymers. The ethylene-based polymer composition comprises a majority amount of units derived from ethylene, based on the weight of the ethylene-based polymer composition. In an embodiment, the ethylene-based polymer composition includes from 50 wt %, or greater than 50 wt %, or 60 wt %, or 70 wt % to 75 wt %, or 80 wt %, or 90 wt %, or 95 wt %, or 99 wt %, or 100 wt % units derived from ethylene, based on the weight of the ethylene-based polymer composition. In an embodiment, the ethylene-based polymer composition includes from 90 wt %, or 95 wt %, or 97 wt % to 99 wt %, or 100 wt % units derived from ethylene, based on the weight of the ethylene-based polymer. The ethylene-based polymer composition may optionally include additives such as an antioxidant. In an embodiment, the ethylene-based polymer composition is composed solely of ethylene-based polymer and excludes additives. Nonlimiting examples of suitable ethylene-based polymer compositions include ethylene homopolymer, ethylene-based interpolymer, and combinations thereof.

The ethylene-based polymer composition excludes microcrystalline wax (i.e., by-product polyethylene wax), Fischer-Tropsch wax, and oxidized Fischer-Tropsch wax. Ethylene-based polymer is structurally distinct from microcrystalline wax because microcrystalline wax has a lower density and more branching than ethylene-based polymer. Ethylene-based polymer is structurally distinct from Fischer-Tropsch wax because Fischer-Tropsch wax is more linear (i.e., has less branching) than ethylene-based polymer.

The ethylene-based polymer composition may or may not be functionalized. In an embodiment, the ethylene-based polymer composition is not functionalized.

The ethylene-based polymer composition may or may not be oxidized to create polarity. Oxidation inserts an oxygen molecule into the structure of the ethylene-based polymer composition, which may be in the form of a carbonyl for example. In an embodiment, the ethylene-based polymer composition is not oxidized.

The ethylene homopolymer is produced by way of Ziegler-Natta catalyst polymerization or metallocene catalyst polymerization yielding a Ziegler-Natta catalyzed ethylene-based polymer or a metallocene-catalyzed ethylene-based polymer, respectively. In an embodiment, the ethylene-based polymer is a low density polyethylene homopolymer.

The ethylene-based interpolymer is selected from an ethylene/α-olefin interpolymer, or an ethylene/α-olefin copolymer. Nonlimiting examples of suitable α-olefins include, for example, $C_3$, $C_4$, $C_5$, $C_6$ and $C_8$ α-olefins.

The ethylene-based polymer composition has a density from 0.880 g/cc, or 0.885 g/cc, or 0.890 g/cc, or 0.895 g/cc, or 0.900 g/cc, or 0.905 g/cc, or 0.910 g/cc to 0.915 g/cc, or 0.920 g/cc, or 0.925 g/cc, or 0.930 g/cc.

The ethylene-based polymer composition has a melt viscosity at 140° C. from 10 mPa·s, or 30 mPa·s to 50 mPa·s, 100 mPa·s, or 180 mPa·s, or 200 mPa·s, or 250 mPa·s, or 300 mPa·s, or 350 mPa·s, or 400 mPa·s, or 450 mPa·s, or 475 mPa·s, or 500 mPa·s, or 550 mPa·s, or 600 mPa·s, or 700 mPa·s, or 800 mPa·s, or 900 mPa·s, or 1,000 mPa·s. In a further embodiment, the ethylene-based polymer composition has a melt viscosity at 140° C. from 20 mPa·s to 450 mPa·s.

The ethylene-based polymer composition has a molecular weight distribution (Mw/Mn) from greater than 1.25, or 1.30, or 1.35, or 1.40, or 1.45, or 1.50, or 1.60, or 1.70, or 1.75, or 1.80, or 1.85, or 1.90 to 1.94, or 1.95, or 1.96, or 1.99, or 2.00, or 2.10, or 2.50, or 2.60, or 2.70, or 2.80, or 2.90, or 3.00. In a further embodiment, the ethylene-based polymer composition has a molecular weight distribution from 1.80 to 1.96.

In an embodiment, the ethylene-based polymer composition has a weight average molecular weight (Mw) from 800 g/mol, or 1,000 g/mol, or 2,000 g/mol, or 3,000 g/mol, or 4,000 g/mol, or 5,000 g/mol, or 6,000 g/mol to 7,000 g/mol, or 8,000 g/mol, or 9,000 g/mol, or 10,000 g/mol.

In an embodiment, the ethylene-based polymer composition has a number average molecular weight (Mn) from 270 g/mol, or 300 g/mol, or 350 g/mol, or 400 g/mol, or 450 g/mol, or 500 g/mol, or 550 g/mol, or 600 g/mol, or 650 g/mol, or 700 g/mol, or 800 g/mol, or 900 g/mol, or 1,000 g/mol, or 1,200 g/mol, or 1,500 g/mol, or 2,000 g/mol, or 2,100 g/mol, or 2,500 g/mol, or 3,000 g/mol, or 3,300 g/mol to 3,500 g/mol, or 4,000 g/mol, or 5,000 g/mol, or 6,000 g/mol, or 7,000 g/mol, or 8,000 g/mol.

In an embodiment, the ethylene-based polymer composition has a Z average molecular weight (Mz) from 1,000 g/mol, or 2,000 g/mol, or 3,000 g/mol, or 3,500 g/mol, or 4,000 g/mol, or 5,000 g/mol, or 6,000 g/mol to 7,000 g/mol, or 8,000 g/mol, or 9,000 g/mol, or 10,000 g/mol, or 11,000 g/mol. The "Z average molecular weight" (Mz) is the third moment average molar mass.

In an embodiment, the ethylene-based polymer composition has a total mole percent unsaturation per 1,000 carbon bonds that is from 0.001%, or 0.005%, or 0.010%, or 0.050%, or 0.100%, or 0.200%, or 0.300%, or 0.400%, or 0.500%, or 0.600%, or 0.700%, or 0.800%, or 0.900% to 1.000%, or 1.050%, or 1.100%, or 1.200%, or 1.300%, or 1.400%, or 1.500%, or 1.600%, or 1.700%, or 1.800%, or 1.900%, or 1.950%, or 2.000%. In another embodiment, ethylene-based polymer composition has a total mole percent unsaturation per 1,000 carbon bonds that is less than 2.000%, or less than 1.500%, or less than 2.000%.

In an embodiment, the ethylene-based polymer composition has a drop point of from 80° C., or 85° C., or 90° C., or 95° C., or 100° C. to 105° C., or 110° C., or 113° C., or 115° C., or 120° C., or 125° C., or 130° C., or 135° C., or 140° C., or 145° C., or 150° C.

In an embodiment, the ethylene-based polymer composition has one, some, or all of the following properties: (i) a density from 0.880 g/cc to 0.930 g/cc; (ii) a melt viscosity at 140° C. from 10 mPa·s to 1,000 mPa·s; (iii) a molecular weight distribution from greater than 1.25 to 3.00; (vi) a weight average molecular weight (Mw) from 800 g/mol to 10,000 g/mol; (v) a number average molecular weight (Mn) from 270 g/mol to 8,000 g/mol; (vi) a Z average molecular weight (Mz) from 1,000 g/mol to 11,000 g/mol; (vii) a drop point from 80° C. to 150° C.; and/or (viii) a total mole percent unsaturation per 1,000 carbon bonds from 0.001% to 2.000%.

In an embodiment, the ethylene-based polymer composition has one, some, or all of the following properties: (i) a density from 0.880 g/cc to 0.930 g/cc; (ii) a melt viscosity at 140° C. from 30 mPa·s to 500 mPa·s; (iii) a molecular weight distribution from 1.80 to 2.00; (vi) a weight average molecular weight (Mw) from 2,000 g/mol to 7,000 g/mol; (v) a number average molecular weight (Mn) from 1,000 g/mol to 4,000 g/mol; (vi) a Z average molecular weight (Mz) from 3,000 g/mol to 10,000 g/mol; (vii) a drop point from 90° C. to 115° C.; and/or (viii) a total mole percent unsaturation per 1,000 carbon bonds from 0.380% to 1.999%.

Nonlimiting examples of suitable ethylene-based polymer compositions include low density polyethylene homopolymers A-C™ 8, A-C™ 617, and A-C™ 1702, available from Honeywell.

The ethylene-based polymer composition is present in the composition in an amount from 1 wt %, or 2 wt %, or 5 wt %, or 7 wt %, or 9 wt % to 10 wt %, or 11 wt %, or 15 wt %, or 20 wt %, or 30 wt %. Weight percent is based on total weight of the composition.

The ethylene-based polymer composition may comprise two or more embodiments disclosed herein.

C. Tackifier

The present composition includes a tackifier. The tackifier has a Ring and Ball softening temperature (measured in accordance with ASTM E 28) from 90° C., or 93° C., or 95° C., or 97° C., or 100° C., or 105° C., or 110° C. to 120° C., or 130° C., or 140° C., or 150° C. The tackifier may modify the properties of the composition such as viscoelastic properties (e.g., tan delta), rheological properties (e.g., viscosity), tackiness (e.g., ability to stick), pressure sensitivity, and wetting property. In some embodiments, the tackifier is used to improve the tackiness of the composition. In other embodiments, the tackifier is used to reduce the viscosity of the composition. In particular embodiments, the tackifier is used to wet out adherent surfaces and/or improve the adhesion to the adherent surfaces.

Tackifiers suitable for the compositions disclosed herein can be solids, semi-solids, or liquids at room temperature. Non-limiting examples of suitable tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof.

In an embodiment, the tackifier includes aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers. These tackifying resins have a ring and ball softening point from 70° C., or 100° C. to 130° C., or 150° C., and will typically have a melt viscosity, at 190° C., as measured using a Brookfield viscometer, of from 1 mPa·s, or 100 mPa·s, or 500 mPa·s to 1,000 mPa·s, or 1,500 mPa·s, or 2,000 mPa·s. They are also available with differing levels of hydrogenation, or saturation, which is another commonly used term. Nonlimiting examples of suitable tackifying resins include Eastotac™ H-100, H-115 and H-130 from Eastman Chemical Co. in Kingsport, Tenn., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac™ H-142R from Eastman Chemical Co. has a softening point of 140° C. Other nonlimiting examples of suitable tackifying resins include Escorez™ 5300, 5400, and 5637, partially hydrogenated aliphatic petroleum hydrocarbon resins, and Escorez™ 5600, a partially hydrogenated aromatic modified petroleum hydrocarbon resin all available from Exxon Chemical Co. in Houston, Tex.; Wingtack™ Extra, which is an aliphatic, aromatic petroleum hydrocarbon resin available from Goodyear Chemical Co. in Akron, Ohio; Hercolite™ 2100, a partially hydrogenated cycloaliphatic petroleum hydrocarbon resin available from Hercules, Inc. in Wilmington, Del.; Norsolene™ hydrocarbon resins from Cray Valley; and Arkon™ water white, hydrogenated hydrocarbon resins available from Arakawa Europe GmbH.

In an embodiment, the tackifier includes aliphatic hydrocarbon resins such as resins resulting from the polymerization of monomers consisting of olefins and diolefins (e.g., Escorez™ 1310LC, Escorez™ 2596 from ExxonMobil Chemical Company, Houston, Ill., or PICCOTAC™ 1095, PICCOTAC™ 9095 from Eastman Chemical Company, Kingsport, Tenn.) and the hydrogenated derivatives thereof; alicyclic petroleum hydrocarbon resins and the hydrogenated derivatives thereof (e.g., Escorez™ 5300 and 5400 series from ExxonMobil Chemical Company; EASTOTAC™ resins from Eastman Chemical Company). In some embodiments, the tackifiers include hydrogenated cyclic hydrocarbon resins (e.g., REGALREZ™ and REGALITE™ resins from Eastman Chemical Company).

In an embodiment, the tackifying agent is a rosin-based tackifier selected from a partially hydrogenated glycerol ester, a fully hydrogenated pentaerythritol ester, a fully hydrogenated glycerol ester, a non-hydrogenated ester with a glass transition temperature (Tg) from 30° C., or 35° C., or 40° C. to 45° C., or 50° C., and combinations thereof.

In an embodiment, the tackifier is an aliphatic hydrogenated hydrocarbon resin. In a further embodiment, the aliphatic hydrogenated hydrocarbon tackifier is a hydrogenated cyclopentadiene-based tackifier. In a further embodiment, the aliphatic hydrogenated hydrocarbon tackifier is a hydrogenated cyclopentadiene-based tackifier with a ring and ball softening point of 115° C. and a melt viscosity at 190° C. of 400 mPa·s, available commercially under the trade name Eastotac™ 11-115W (available from Eastman Chemical).

The tackifier is present in the composition in an amount from 1 wt %, or 5 wt %, or 9 wt %, or 10 wt %, or 15 wt %, or 19 wt % to 20 wt %, or 21 wt %, or 23 wt %, or 25 wt %, or 30 wt %, or 35 wt %, or 40 wt %, or 45 wt %, or 49 wt %. In a further embodiment, the tackifier is present in the composition in an amount that is less than 50 wt %. Weight percent is based on the total weight of the composition.

The tackifier may comprise two or more embodiments disclosed herein.

D. Additives

The present composition may include one or more additives. Nonlimiting examples of suitable additives include plasticizers, oils such as mineral oil, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, cross-linking agents, neutralizing agents, flame retardants, fluorescing agents, compatibilizers, antimicrobial agents, and water.

In an embodiment, the composition includes polymeric additives. Nonlimiting examples of suitable polymeric additives include styrenic block copolymer such as those available from Kraton under the trade name KRATON™ polymers; ethylene/α-olefin copolymer such as those available from The Dow Chemical Company under the trade name ENGAGE™; ethylene/α-olefin terpolymers, such as an ethylene-based polymer containing two types of α-olefins; and combinations thereof.

In an embodiment, the composition includes an antioxidant. The antioxidant protects the composition from degradation caused by reaction with oxygen induced by such things as heat, light, or residual catalyst from the raw materials such as the tackifying resin. Suitable antioxidants include high molecular weight hindered phenols and multifunctional phenols such as sulfur and phosphorous-containing phenol. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

Such antioxidants are commercially available from Ciba Specialty Chemicals and include Irganox™ 565, 1010, 1076 and 1726, which are hindered phenols. These are primary antioxidants act as radical scavengers and may be used alone or in combination with other antioxidants such as phosphite antioxidants like Irgafos™ 168, available from Ciba Specialty Chemicals. Phosphite catalysts are considered secondary catalysts and are not generally used alone. These are primarily used as peroxide decomposers. Other available catalysts are Cyanox™ LTDP, available from Cytec Industries, and Ethanox™ 330, available from Albemarle Corp. Many such antioxidants are available either to be used alone or in combination with other such antioxidants.

In an embodiment, the composition contains from 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt % additive, based on total weight of the composition.

In an embodiment, the composition contains from 0.1 wt %, or 0.2 wt %, or 0.3 wt %, or 0.4 wt %/to 0.5 wt %, or 0.6 wt %, or 0.7 wt %, or 0.8 wt %, or 1.0 wt %, or 2.0 wt %, or 2.5 wt %, or 3.0 wt % antioxidant, based on total weight of the composition.

The additive may comprise two or more embodiments disclosed herein.

E. Composition

In an embodiment, the composition includes: (A) equal to or greater than 50 wt % propylene-based interpolymer, such as PBPE, having a density from 0.850 g/cc to 0.900 g/cc; (B) an ethylene-based polymer composition having a melt viscosity at 140° C. from 10 mPa·s to 1,000 mPa·s; and (C) a tackifier; and (D) optional antioxidant, and the composition has a molecular weight distribution ratio from 1.00 to 1.40; and a density ratio from 0.93 to 1.30.

The propylene-based interpolymer, ethylene-based polymer composition, tackifier, and antioxidant may be any respective propylene-based interpolymer, ethylene-based polymer composition, tackifier and antioxidant disclosed herein.

In an embodiment, the combined amount of (A) propylene-based interpolymer, (B) ethylene-based polymer, and (C) tackifier equals from 95 wt %, or 97 wt % to 98 wt %, or 99 wt %, or 100 wt % of the composition.

In an embodiment, the weight ratio of (A) propylene-based interpolymer to (B) ethylene-based polymer is from 2.00, or 3.00, or 4.00, or 5.00, or 6.00 to 7.00, or 8.00, or 9.00, or 10.00.

In an embodiment, the composition has a melt viscosity, at 177° C., from 300 mPa·s, or 350 mPa·s, or 400 mPa·s, or 500 mPa·s, or 600 mPa·s, or 700 mPa·s, or 800 mPa·s, or 850 mPa·s, or 900 mPa·s, or 1.000 mPa·s, or 1,200 mPa·s, or 1.400 mPa·s to 1,500 mPa·s, or 1,600 mPa·s, or 1,800 mPa·s, or 2,000 mPa·s, or 2,500 mPa·s, or 3,000 mPa·s, or 3,500 mPa·s, or 4,000 mPa·s.

In an embodiment, the composition has a fiber tear greater than 50%, or greater than 55%, or greater than 60%, or greater than 70%, or greater than 75%, or greater than 80%, or greater than 85%, or greater than 90% to 100% at a temperature from −40° C. to 60° C. High fiber tear is especially advantageous for HMA compositions utilized in the packaging industry because, during transportation and storage of a package, the package is regularly exposed to extreme temperatures (as low as −40° C. and as high as 60° C.). Adhesive compositions used in packages, such as boxes or cartons, must maintain sufficient adhesion across the entire range of the extreme temperatures (−40° C. to 60° C.).

In an embodiment, the composition has a fiber tear after aging for 24 hours at 177° C. from greater than 50%, or greater than 55%, or greater than 60%, or greater than 70%, or greater than 75%, or greater than 80%, or greater than 85%, or greater than 90% to 100% at a temperature from −40° C. to 60° C.

In an embodiment, the composition has a peel adhesion failure temperature (PAFT) of from 40° C., or 45° C., or 50° C., or 55° C., or 60° C., or 65° C. to 70° C., or 75° C., or 80° C. In an embodiment, the composition has a peel adhesion failure temperature (PAFT) greater than or equal to 45° C., or greater than or equal to 55° C., or greater than or equal to 60° C.

In an embodiment, the composition has a set time from 0.5 sec., or 1.0 sec., or 1.5 sec., or 2.0 sec. to 3.0 sec., or 3.5 sec., or 4.0 sec., or 4.5 sec., or 4.9 sec., or 5.0 sec., or 6.0 sec., or 7.0 sec., or 8.0 sec., or 9.0 sec., or 9.5 sec., or 9.9 sec., or 10.0 sec.

In an embodiment, the composition has an open time from 20 sec., or 25 sec., or 27 sec., or 30 sec., or 35 sec., or 37 sec., or 39 sec. to 40 sec., or 45 sec., or 50 sec., or 60 sec. In a further embodiment, the composition has an open time of equal to or greater than 20 sec.

In an embodiment, the ratio of the density of the propylene-based interpolymer to the density of the ethylene-based polymer composition (the "density ratio") is from 0.90, or 0.91, or 0.92, or 0.93, or 0.94, or 0.95 to 0.96, or 0.97, or 0.98, or 0.99, or 1.00, or 1.01, or 1.02, or 1.03, or 1.04, or 1.05, or 1.06, or, 1.07, or 1.08, or 1.09, or 1.10, or 1.20, or 1.30. The density ratio is calculated in accordance with the Equation below:

$$\text{Density Ratio} = \frac{\text{density of the propylene based interpolymer}}{\text{density of the ethylene based polymer compostion}}$$

In an embodiment, the ratio of the molecular weight distribution (Mw/Mn) of the propylene-based interpolymer to the molecular weight distribution of the ethylene-based polymer composition (the "molecular weight distribution ratio", or the "MWDp/MWDe ratio") is from 1.00, or 1.10, or 1.15, or 1.16 to 1.17, or 1.18, or 1.19, or 1.20, or 1.21, or 1.22, or 1.23, or 1.24, or 1.25, or 1.26, or 1.27, or 1.28, or 1.29, or 1.30, or 1.35, or 1.40. The MWDp/MWDe ratio is calculated in accordance with the Equation below:

$$MWDp/MWDe \text{ Ratio} = \frac{Mw/Mn \text{ of the propylene based interpolymer}}{Mw/Mn \text{ of the ethylene based polymer composition}}$$

In an embodiment, the composition has a density ratio from 0.90, or 0.93, or 0.95 to 1.1, or 1.30 and a MWDp/MWDe ratio from 1.00, or 1.10 to 1.30, or 1.40.

In an embodiment, the composition has a melt viscosity at 177° C. from 300 mPa·s to 4,000 mPa·s; a fiber tear greater than 50% at a temperature from −40° C. to 60° C.; a fiber tear after aging for 24 hours at 177° C. greater than 50% at a temperature from −40° C. to 60° C.; a PAFT from 40° C. to 80° C.; a set time less than or equal to 10 sec.; an open time equal to or greater than 20 sec.; a density ratio from 0.90, or 0.93 to 1.30; and/or a MWDp/MWDe ratio from 1.00 to 1.40.

Not wishing to be bound by any particular theory, Applicants believe that an ethylene-based polymer composition with a density from 0.880 g/cc to 0.930 g/ee and a broad molecular weight distribution (from greater than 1.25 to 3.00) results in improved compatibility between the propylene-based interpolymer and the ethylene-based polymer composition. The unexpected compatibility of the propylene-based interpolymer, and further the PBPE, and the ethylene-based polymer composition having a melt viscosity at 140° C. of 10-1,000 mPa·s, the composition having a MWDp/MWDe ratio from 1.00 to 1.40 and a density ratio of 0.93 to 1.30, is exemplified by the composition exhibiting sufficient adhesive performance (fiber tear greater than 50% at a temperature from −40° C. to 60° C.), as well as an open time greater than 20 sec. and a set time less than 10 sec. Applicants believe a MWDp/MWDe from 1.00 to 1.40, and further a broader ethylene-based polymer molecular weight distribution, results in improved homogenous distribution of the ethylene-based polymer in the propylene-based interpolymer.

The composition is prepared by blending the components in a melt at a temperature from 170° C. to 190° C., or from 170° C. to 180° C. to form a homogeneous blend.

In an embodiment, the composition is an adhesive composition, and further a hot melt adhesive (HMA) composition, which includes:

(A) from 50 wt % to 90 wt % propylene-based polymer, such as PBPE, having a density from 0.850 g/cc to 0.900 g/cc;

(B) from 1 wt % to 30 wt % ethylene-based polymer composition having: (i) a density from 0.880 g/cc to 0.930 g/cc; (ii) a melt viscosity at 140° C. from 10 mPa·s to 1,000 mPa·s; and (iii) a molecular weight distribution from greater than 1.25 to 3.0;

(C) from 1 wt % to 49 wt % tackifier; and (D) from 0 wt %, or 0.1 wt % to 3.0 wt % antioxidant, wherein the combined amount of (A) propylene-based interpolymer, (B) ethylene-based polymer, and (C) tackifier equals at least 95 wt % of the composition; the composition has a density ratio from 0.90, or 0.93 to 1.30 and a MWDp/MWDe ratio from 1.00 to 1.40; and the composition has one, some, or all of the following properties:

(i) a melt viscosity at 177° C. from 300 mPa·s to 4,000 mPa·s;

(ii) a fiber tear from greater than 50% to 100% at a temperature from −40° C. to 60° C.;

(iii) a fiber tear after aging for 24 hours at 177° C. from greater than 50% to 100% at a temperature from −40° C. to 60° C.;

(iv) a peel adhesion failure temperature (PAFT) from 40° C. to 80° C.;

(v) a set time from 0.5 seconds (sec.) to 10 sec.; and/or (vi) an open time from 20 sec. to 60 sec.

In an embodiment, the composition is an adhesive composition, and further a hot melt adhesive (HMA) composition, which includes:

(A) from 55 wt % to 90 wt % propylene-based polymer, such as PBPE, having a density from 0.860 g/cc to 0.900 g/cc;

(B) from 1 wt % to 30 wt % ethylene-based polymer composition having: (i) a density from 0.880 g/cc to 0.930 g/cc; (ii) a melt viscosity at 140° C. from 10 mPa·s to 500 mPa·s; and (iii) a molecular weight distribution from 1.8 to 2.0;

(C) from 5 wt % to 30 wt % tackifier; and (D) from 0.1 wt % to 1.0 wt % antioxidant, wherein the combined amount of (A) propylene-based interpolymer, (B) ethylene-based polymer, and (C) tackifier equals at least 97 wt % of the composition; the composition has a density ratio from 0.95 to 1.0 and a MWDp/MWDe ratio from 1.10 to 1.30; and the composition has one, some, or all of the following properties:

(i) a melt viscosity at 177° C. from 300 mPa·s to 2,000 mPa·s;

(ii) a fiber tear from greater than 55% to 100% at a temperature from −40° C. to 60° C.;

(iii) a fiber tear after aging for 24 hours at 177° C. from greater than 55% to 100% at a temperature from −40° C. to 60° C.;

(iv) a peel adhesion failure temperature (PAFT) from 45° C. to 80° C.;

(v) a set time from 0.5 sec. to 9 sec.; and/or (vi) an open time from 25 sec. to 60 sec.

It is understood that the sum of the components (A)-(D) in each of the foregoing adhesive compositions yields 100 weight percent.

The composition may comprise two or more embodiments disclosed herein.

F. Article

The present disclosure provides an article. The article includes at least one component formed from the present composition. The composition can be any composition as disclosed above. In an embodiment, the composition is an HMA composition. Nonlimiting examples of suitable articles include HMA bonded cardboard packaging boxes, multilayer articles, wood articles and non-woven articles.

In an embodiment, that article includes a substrate. The composition is on at least one surface of the substrate. Nonlimiting examples of suitable substrates include film, sheets, fabric, cardboard and wood.

In an embodiment, the composition forms a seal between the at least one surface of the substrate and at least one surface of another substrate.

The present article may comprise two or more embodiments disclosed herein.

Test Methods

Density is measured in accordance with ASTM D792, Method B. The result is recorded in grams (g) per cubic centimeter (g/ee or g/cm$^3$).

Drop point is measured in accordance with ASTM D 3954.

Ring-and-ball softening point is measured using a Mettler Toledo FP900 Thermosystem according to ASTM E28.

Melt viscosity was measured using a Brookfield Viscometer Model, and a Brookfield RV-DV-II-Pro viscometer spindle 31, at 177° C. for the PBPE, at 177° C. for the composition, at 140° C. for the ethylene-based polymer composition, and at 190° for the tackifier. The sample was poured into the chamber, which was, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) was heated to the required temperature until the melted sample was one inch below the top of the sample chamber. The viscometer apparatus was lowered, and the spindle submerged into the sample chamber. Lowering was continued, until the brackets on the viscometer align on the Thermosel. The viscometer was turned on, and set to operate at a shear rate, which leads to a torque reading in the range of 40 to 60 percent of the total torque capacity, based on the rpm output of the viscometer. Readings were taken every minute for 15 minutes, or until the values stabilize, at which point, a final reading was recorded.

Peel adhesion failure temperature (PAFT) was tested according to ASTM D 4498 with a 100 gram weight in the peel mode. The tests were started at room temperature (25° C./77° F.) and the temperature was increased at an average rate of 0.5° C./minute. Samples for PAFT testing were prepared using two sheets of 40 pound Kraft paper, each of 6×12 in (152×305 mm) dimensions. On the bottom sheet, lengthwise and separated by a gap of 1 in (25 mm), were adhered in parallel fashion two 1.75 in or 2 in (45 mm or 51 mm) wide strips of a one sided, pressure-sensitive tape such as masking tape. The composition sample to be tested was heated to 177° C. (350° F.) and drizzled in an even manner down the center of the gap formed between the tape strips. Then, before the composition can unduly thicken, two glass rods, one rod riding immediately upon the tapes and shimmed on each side of the gap with a strip of the same tape followed by the second rod and (between the two rods) the second sheet of paper, were slid down the length of the sheets. This was done in a fashion such that the first rod evenly spreads the composition in the gap between the tape strips and the second rod evenly compresses the second sheet over the top of the gap and on top of the tape strips. Thus, a single 1 inch (25.4 mm) wide strip of sample composition was created between the two tape strips, and bonding the paper sheets. The sheets so bonded were cut crosswise into strips of width 1 inch (25.4 mm) and length of 3 inches (76.2 mm), each strip having a 1×1 in (25×25 mm) adhesive sample bond in the center. The strips were then employed in the PAFT testing, as desired.

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at 190° C.; the melted sample was then air-cooled to room temperature (25° C.). A 5-8 mg, 6 mm diameter specimen was extracted from the cooled polymer, weighed, placed in a light aluminum pan (50 mg), and crimped shut. The sample pan was placed in a DSC cell, and then heated, at a rate of approximately 10° C./min, to a temperature of 180° C. for PE (230° C. for polypropylene or "PP"). The sample was kept at this temperature for 3 minutes in order to remove its thermal history. Then, the sample was cooled at a rate of 10° C./min to −60° C. for PE (−40° C. for PP), and kept isothermally at that temperature for 3 minutes. The sample was next heated to 180° C. (this is the "second heat" ramp) at a rate of 10° C./min, until complete melting (second heat). The cooling and second heating curves were recorded. The values determined are extrapolated onset of melting, $T_m$, and extrapolated onset of crystallization, $T_c$. Heat of fusion ($H_f$) (in Joules per gram), and the calculated % crystallinity for polyethylene samples using the Equation below:

$$\% \text{ Crystallinity} = ((H_f)/292 \text{ J/g}) \times 100$$

The heat of fusion ($H_f$) and the peak melting temperature were reported from the second heat curve. Peak crystallization temperature was determined from the cooling curve.

Melting point, $T_m$, was determined from the DSC heating curve by first drawing the baseline between the start and end of the melting transition. A tangent line was then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, r, was determined from a DSC cooling curve as above except the tangent line was drawn on the high temperature side of the crystallization peak. Where this tangent intersects the baseline is the extrapolated onset of crystallization (T).

Glass transition temperature, $T_g$, was determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines were drawn from below and above the glass transition region and extrapolated through the T region. The temperature at which the sample heat capacity was half-way between these baselines is the $T_g$.

A high temperature gel permeation chromatography (GPC) system, equipped with Robotic Assistant Deliver (RAD) system was used for sample preparation and sample injection. The concentration detector was an Infra-red detector (IR-5) from Polymer Char Inc. (Valencia, Spain). Data collection was performed using a Polymer Char DM 100 Data acquisition box. The carrier solvent was 1,2,4-trichlorobenzene (TCB). The system was equipped with an on-line solvent degas device from Agilent. The column compartment was operated at 150° C. The columns were four Mixed A LS 30 cm, 20 micron columns. The solvent was nitrogen-purged 1,2,4-trichlorobenzene (TCB) containing approximately 200 ppm 2,6-di-t-butyl-4-methylphenol (BHT). The flow rate was 1.0 mL/min, and the injection volume was 200 µl. A "2 mg/mL" sample concentration was prepared by dissolving the sample in $N_2$ purged and preheated TCB (containing 200 ppm BHT), for 2.5 hours at 160° C., with gentle agitation.

The GPC column set was calibrated by running twenty narrow molecular weight distribution polystyrene standards. The molecular weight (MW) of the standards ranges from 580 g/mol to 8,400,000 g/mol, and the standards were contained in six "cocktail" mixtures. Each standard mixture had at least a decade of separation between individual molecular weights. The equivalent polypropylene molecular weights of each PS standard were calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N.Y. Hellman. & P. M. Muglia, Macromolecules, 4,507 (1971)):

$$M_{PP} = \left(\frac{K_{PS} M_{PS}^{a_{PS}+1}}{K_{PP}}\right)^{\frac{4}{a_{PP}+1}}, \quad (Eq\ 1)$$

where $M_{pp}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration was generated using a fourth order polynomial fit as a function of elution volume. Number average and weight average molecular weights were calculated according to the following equations:

$$M_n = \frac{\Sigma^i w f_i}{\Sigma^i (w f_i / M_i)}, \quad (Eq\ 2)$$

$$M_W = \frac{\Sigma^i (w f_i - M_i)}{\Sigma^i (w f_i)}, \quad (Eq\ 3)$$

Z average molecular weight was calculated according to the following equation:

$$M_z = \frac{\Sigma^i (w f_i - M_i) M i}{\Sigma^i (w f_i) M_i}, \quad (Eq\ 4)$$

where $M_i$ is the molecular weight at a slice of i (elution component i), and $Wf_i$ is the weight fraction of the polymer chains having a molecular weight of Mt.

For the ethylene-based polymers and the comparative waxes, the high temperature GPC method described above was modified. For the ethylene-based polymers and the comparative waxes, molecular weight and molecular weight distribution were characterized using an Infra-red detector (IR-5) from Polymer Char Inc. (Valencia, Spain). The system was equipped with a solvent delivery pump, an on-line solvent degas device, and a column oven from Agilent. The auto-sampler was model 1-12400. The column compartment and detector compartment were operated at 150° C. The columns were two PLgel Mixed-E columns, 3 micron columns, from Agilent. The solvent was nitrogen-purged 1,2,4-trichlorobenzene (TCB) containing approximately 200 ppm 2,6-di-t-butyl-4-methylphenol (BHT). The flow rate was 0.7 mL/min, and the injection volume was 200 μl. A "2 mg/ml." sample concentration was prepared by dissolving the sample in $N_2$ purged and preheated TCB (containing 200 ppm BHT), for 0.5 hours at 150° C., with gentle agitation on the auto-sampler prior to injection. Calibration of the two Mixed-E column set was performed with five low molecular weight, narrow polydispersed polyethylene references (from Polymer Laboratories, now Agilent) and two saturated hydrocarbon monomers (Eicosane and Decane, from Aldrich). The molecular weights of the references ranged from 142 to 32,000 g/mol. A third order polynomial was used to establish the molecular weight-elution volume calibration curve. The correlation coefficient is 0.9999, based on the r-square.

$^{33}$C NMR was used for ethylene content, Koenig B-value, triad distribution, and triad tacticity and is performed as follows:

The samples were prepared by adding approximately 2.7 g of a 50/50 mixture of tetrachloroethane-$d_2$/orthodichlorobenzene containing 0.025 M Cr(AcAc)$_3$ to 0.20-0.30 g sample in a Norell 1001-7 10 mm NMR tube. The samples were dissolved and homogenized by heating the tube and its contents to 150° C. using a heating block and heat gun. Each sample was visually inspected to ensure homogeneity.

The data was collected using a Bruker 400 MHz spectrometer equipped with a Bruker Dual DUL high-temperature CryoProbe. The data was acquired using 320 transients per data file, a 6 sec. pulse repetition delay, 90° flip angles, and inverse gated decoupling with a sample temperature of 120° C. All measurements were made on non-spinning samples in locked mode. Samples were allowed to thermally equilibrate for 7 minutes prior to data acquisition. Percent mm tacticity and wt % ethylene was then determined according to methods commonly used in the art.*

REFERENCES

For composition (wt % F): S. Di Martino and M. Kelchtermans; J. Appl. Polym. Sci., V 56, 1781-1787(1995)

Tacticity, detailed assignments: V. Busico, R. Cipullo; Prog. Polym. Sci. V 26, 443-533 (2001)

The "Koenig B-value" or chi statistic is one measure of randomness or blockiness in a propylene ethylene random copolymer. A value of 1.0 indicates a random copolymer and a value of zero indicates complete blocks of monomers A and B. A B-value of 2 indicates an alternating copolymer. B=[EP]/(2[P]([E]), where [EP] is the total mole fraction of EP dimers (EP+PE, or (EEP+PPE+PEP+EPE)), and [E] is the mole fraction ethylene, and [P]=1−[E]. Jack L. Koenig, *Spectroscopy of Polymers* (2d ed. 1999).

$^1$H NMR Analysis—Total Unsaturation Per Mole Propylene

Samples were prepared by adding approximately 3.25 g of a 50/50 mixture of tetrachloroethane-d2/perchlorethylene that is 0.0015M in chromium acetylacetonate (relaxation agent) to 0.130 g sample in a 10 mm NMR tube. The samples were dissolved and homogenized by heating the tube and its contents to 110° C. The data was collected using a Bruker 400 MHz spectrometer equipped with a Bruker Dual DUL high-temperature CryoProbe. The unsaturation data was collected using 4 scans per data file, a 15.6 sec. pulse repetition delay with a sample temperature of 120° C. The acquisition was carried out using spectral width of 10,000 Hz and a file size of 16K data points. The presaturation experiment was run with a modified pulse sequence, 1clprf2.zz1 using 100 scans per data file.

| 1H NMR Analysis. - Total Unsaturation Per 1,000 Carbon Bonds Calculations | |
|---|---|
| Moles of H from propylene | Mol fraction propylene * (integral area δ 3.5 – 0.2 ppm) |
| Total moles propylene | $\dfrac{\text{moles } H \text{ from propylene}}{6 \text{ protons}}$ |
| Mol % vinyl unsaturation/mol propylene | $\dfrac{100 * \text{moles vinyl}}{\text{Total moles propylene}}$ |
| Mol % Cis/Trans Unsaturation/mol propylene | $\dfrac{100 * \text{moles cis/trans}}{\text{Total moles propylene}}$ |
| Mol % trisubstituted unsaturation/mol propylene | $\dfrac{100 * \text{moles trisub}}{\text{Total moles propylene}}$ |
| Mol % vinylidene unsaturation/mol propylene | $\dfrac{100 * \text{moles vinylidene}}{\text{Total moles propylene}}$ |
| Total mol % unsaturation/mol propylene Mol % vinyl + Mole cis&trans + Mo! % trisub + Mol + vinylidene | |

Samples were prepared by $^1$H NMR experimental procedures: samples were dissolved in NMR tubes to concentrations of approximately 0.05 g/ml. The solvent used was chloroform-d with 0.02 M Cr(acac)$_3$ (chromium(III) acetylacetone) added. The tubes were then heated in a heating block set at 50° C. The samples were vortexed and heated to ensure homogeneous solutions were achieved. The $^1$H NMR was taken in a Vairan Inova 600 MHz spectrometer equipped with an 8 mm inverse probe. The relaxation time used is 35 sec., 90 deg pulse of 7.8 us, 64 scans. The spectra were centered at 4 ppm with spectral width of 16.7 ppm.

Fiber Tear (%) Percent fiber tear (I) of compositions using Inland corrugated cardboard was determined according to a standardized method. A bead of sample composition was applied on to a cardboard coupon (5×6 cm) using an Olinger Bond Tester, and a second coupon was quickly placed on top of the sample composition. Light finger pressure, for about 3 sec., was applied to hold the bond in place. Ten samples of each composition were prepared.

Five samples of each composition were conditioned for at least 4 hours at room temperature and 50% relative humidity. The samples were pulled apart by hand and the failure mode (fiber tear, cohesive failure, adhesive failure) was recorded. The average of the five samples was calculated.

The other five samples of each composition were conditioned at a temperature of 177° C. for 24 hrs. The samples were pulled apart by hand and the failure mode (fiber tear, cohesive failure, adhesive failure) was recorded. The average of the five samples was calculated.

Set Time and Open Time properties were determined using the Olinger Bond Tester, a mechanical testing device used to form and tear test bonds. The Olinger Bond Tester was heated to 350° C. (177° C.). The bottom substrate, 2.5" (63.5 mm)×2" (50.8 mm) corrugated board, moved on a track under the adhesive pot which delivered a bead of polymer approximately 1/16" (1.6 mm) to 1/8" (3.2 mm) wide, and 1" (25.4 mm) long. The adhesive pot pressure was increased, or decreased, in order to maintain consistent bead size. A top substrate, 2.5" (63.5 mm)×2" (50.8 mm), was applied to the bottom substrate, with a pressure of 2 bars.

The Olinger has 2 timers, capable of measuring set-time and open-time potential to the nearest second.

Open Time measurement—is the longest time period between adhesive application to one substrate, and the bonding with a second substrate, that results in a 75% fiber-tearing bond. For testing, compression time (or set time) was set to the time determined by set time measurement to achieve 100% fiber tear. Open time was set at 10 sec. and increased in 10 sec. intervals until less than 50% fiber tear was achieved. The open time was decreased by 5 sec and % fiber tear determined. Finally, open time was changed by 1 sec. interval to determine the maximum allowable time to achieve 75% or greater fiber tear.

Set Time measurement—is the minimum compression time required to achieve a fiber-tearing bond. For testing, open time was set at 2 sec. A bond was formed as the top substrate was compressed onto the bottom substrate. After a preset compression time, a tear test was executed as the top substrate was pulled from the bottom substrate. A visual assessment was then made to determine the percentage of fiber tear achieved under the preset test conditions. The set time was changed in 1 sec. intervals, determining the time to achieve 100% fiber tear and less than 75% fiber tear. The set time was recorded as the shortest time, to the nearest second, at which a minimum of 75% fiber tear was obtained.

By way of example, and not limitation, some embodiments of the present disclosure will now be described in detail in the following Examples.

EXAMPLES

1. Preparation of PBPE

A propylene-based interpolymer (for example, a PBPE) was produced utilizing Catalyst A, a hafnium metal complex of a polyvalent aryloxyether catalyst. Table 1 below provides the name and structure for Catalyst A.

TABLE 1

Catalyst A hafnium, [[2',2'''-[(1R,2R)-1,2-cylcohexanediylbis(methyl-eneoxy-κO)]bis[3-(9H-carbazol-9-yl)-5-methyl[1,1'-bihenyl]-2-olato-κO]](2-)]dimethyl

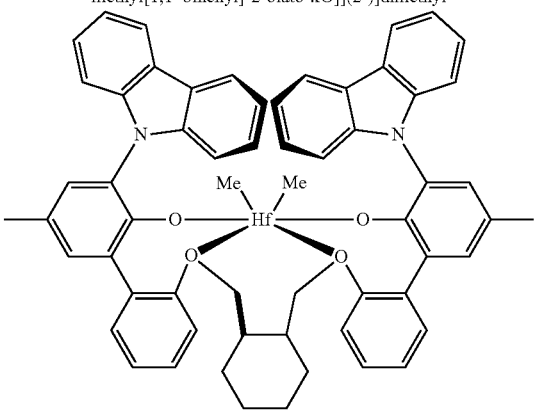

The PBPE was made according to the following procedure. Catalyst A and cocatalyst component solutions were metered using pumps and mass flow meters and were combined with the catalyst flush solvent and introduced into the bottom of the reactor. The cocatalyst used was a long-chain alkyl ammonium borate of approximate stoichiometry equal to methyl di(octadecyl)ammonium tetrakis(pentafluorophenyl)borate (MDB) combined with a tertiary component, tri(isobutyl)aluminum modified methalumoxane (MMAO) containing a molar ratio of i-butyl/methyl groups of 1/3. For Catalyst A, the cocatalyst was in a molar ratio based on Hf of 1.2/1, and MMAO (25/1 Al/Hf).

The polymerization process was exothermic. About 900 British thermal units (BTUs) were released per pound (2009 kJ/kg) of propylene polymerized and about 1,500 BTUs released per pound (3489 kJ/kg) of ethylene polymerized. The primary process design consideration was the removal of the heat of reaction. The propylene-ethylene (P-E) copolymers were produced in a low-pressure, solution polymerization loop reactor, made up of a 3 inch (76 mm) loop pipe plus two heat exchanges, the total volume of which is 31.4 gallons (118.9 liter). Solvent and monomer (propylene) were injected into the reactor as a liquid. The comonomer (ethylene) gas was fully dissolved in the liquid solvent. The feed was cooled to 5° C. before injection into the reactor. The reactor operated at polymer concentration from 15 wt % to 20 wt %. The adiabatic temperature rise of the solution accounted for some of the heat removal from the polymerization reaction. Heat exchangers within the reactor were utilized to remove the remaining heat of reaction allowing for reactor temperature control at the reaction temperatures.

The solvent used was a high purity iso-paraffinic fraction available from Exxon under the trademark Isopar E. Fresh propylene was passed through a bed of Selexsorb COS for purification before mixing with a recycle stream containing solvent, propylene, ethylene, and hydrogen. After mixing with the recycle stream, the combined stream was passed through a bed of 75 wt % Molecular Sieve 13X and 25 wt % Selexsorb CD for further purification before using a high pressure 700 psig (4826 kPa) feed pump to pass the contents to the reactor. Fresh ethylene was passed through a Selexsorb COS bed for purification before compressing the stream to 750 psig (5171 kPa). Hydrogen (a telogen used to reduce molecular weight) was mixed with the compressed ethylene before the two were mixed/dissolved into the liquid feed. The total stream was cooled to an appropriate feed temperature (5° C.). The reactor operated at 500-525 psig (3447-3619 kPa) and the control temperature is reported in Table 1A. The propylene conversion in the reactor was maintained by controlling the catalyst injection rate. The reaction temperature was maintained by controlling the water temperature across the shell side of the heat exchanger at 85° C. The residence time in the reactor was short (10 minutes). The propylene conversion per reactor pass is reported in Table 1A.

Upon exiting the reactor, water and additive were injected into the polymer solution. The water hydrolyzes the catalyst, terminating the polymerization reaction. The additives consist of antioxidants, i.e., 500 ppm of a phenolic and 1000 ppm of a phosphite, which remained with the polymer and acted as stabilizers to prevent polymer degradation while in storage before subsequent fabrication at an end-users facility. The post-reactor solution was super-heated from reactor temperature to 230° C. in preparation for a two-stage devolatilization. The solvent and unreacted monomers were removed during the devolatilization process. The polymer melt was pumped to a die for underwater pellet cutting.

Solvent and monomer vapors exiting the top of the devolatilizers were sent to a coalescer. The coalescer removes polymer entrained in the vapor during devolatilization. The clean vapor stream leaving the coalescer was partially condensed through a series of heat exchangers. The two-phase mixture entered a separation drum. The condensed solvent and monomers were purified (this is the recycle stream described above) and re-used in the reaction process. The vapors leaving the separating drum, mostly containing propylene and ethylene, were sent to a block flare and burned.

The process conditions for the PBPE produced by the foregoing process are provided in Table 1A below, and the properties are provided in Table 2 below.

TABLE 1A

Process Conditions for PBPE1

| | | | |
|---|---|---|---|
| Reactor Control Temp. (° C.) | 140 | Catalyst Flow (lb/hr) | 0.29 |
| Solvent (Isopar-E) Feed (lb/hr) | 17.75 | Catalyst Conc. (ppm) | 8.99 |
| Propylene Feed (lb/hr) (monomer) | 8.40 | Cocatalyst-1 Flow (lb/hr) | 0.19 |
| Ethylene Feed (lb/hr) (comonomer) | 0.72 | Cocatalyst-1 Conc. (ppm) | 112.81 |
| Reactor Propylene Conversion (wt %) | 90.48 | Cocatalyst-2 Flow (lb/hr) | 0.17 |
| Hydrogen Feed (SCCM) | 254.08 | Cocatalyst-2 Conc. (ppm) | 22.95 |

TABLE 2

Properties for PBPE1

| | | | |
|---|---|---|---|
| wt % $C_2$ | 5.7 | Mn (g/mol) | 10,708 |
| wt % $C_3$ | 94.3 | Mw (g/mol) | 24,259 |
| Density (g/cc) | 0.8848 | Mw/Mn | 2.27 |
| PBPE Viscosity at 177° C. (mPa · s) | 1,042 | B-Value | 0.95 |
| $T_m$ (° C.) | 104.8 | Total mol % unsat/mol propylene | 0.0176 |
| $T_c$ (° C.) | 72.9 | Isotacticty | |
| % Crystallinity | 28.0 | (% mm) | 96.4 |
| $H_f$ (J/g) | 46.2 | (% mr) | 1.7 |
| | | (% rr) | 2.0 |

Isotacticity in Table 2 was determined with $^{13}C$ NMR. The samples were prepared by adding approximately 2.6 g of a 50/50 mixture of tetrachloroethane-d2/orthodichlorobenzene that is 0.025M in chromium acetylacetonate (relaxation agent) to a 0.2 g sample in a 10 mm NMR tube. The samples were dissolved and homogenized by heating the tube and its contents to 150° C. The data was collected using a Bruker 400 MHz spectrometer equipped with a Bruker Dual DUL high-temperature CryoProbe. The data was acquired using 160 scans per data file, a 6 sec. pulse repetition delay with a sample temperature of 120° C. The acquisition was carried out using spectral width of 25,000 Hz and a ile size of 32K data points.

2. Production of Compositions

The properties of the ethylene-based polymers and the comparative waxes are provided in Table 3 below. The term "ND" denotes "not detectable."

Table 4 shows inventive compositions containing the present ethylene-based polymer composition, a PBPE and a tackifier that have a density ratio from 0.93 to 1.30 and a MWDp/MWDe ratio from 1.00 to 1.40 (Ex. 1, Ex. 2, Ex. 3) unexpectedly exhibit adhesive properties comparable to compositions with a density ratio of less than 0.93 (CS 1, CS 2, CS 3), such as a PAFT greater than 45° C., while also exhibiting excellent (i.e., long) open times of greater than 25 sec. Further, the inventive compositions (Ex. 1, Ex. 2, Ex. 3) exhibit adhesive properties comparable to compositions containing a PBPE, tackifier, and a propylene-based polymer (PP 6102) (CS 4), such as a fiber tear greater than 55%

TABLE 3

Ethylene-Based Polymer (Component B) and Comparative Wax Properties

|  | A-C 1702[1] | A-C 617[1] | A-C 8[1] | Polywax 850[2]* | Polywax 2000[2]* | PE 4201[3]* | PP 6102[4]* |
|---|---|---|---|---|---|---|---|
| Density (g/cc) | 0.880 | 0.910 | 0.930 | 0.960 | 0.970 | 0.970 | 0.900 |
| Melt Viscosity @ 140° C. (mPa · s) | 30 | 180 | 450 | 20 | 110 | 60 | 450 |
| Drop Point (° C.) | 90 | 101 | 113 | 107 | 126 | 128 | 145 |
| Tm (° C.) |  |  |  | 107 | 126 |  |  |
| Mw (g/mol) | 2,156 | 4,195 | 6,546 | 1.002 | 2,560 | 3,064 | 6672 |
| Mn (g/mol) | 1,200 | 2,139 | 3,368 | 899 | 2,278 | 1,562 | 3104 |
| Mz (g/mol) | 3,920 | 6,354 | 9,554 | 1,122 | 2,852 | 5,001 | 11157 |
| Mw/Mn | 1.80 | 1.96 | 1.94 | 1.11 | 1.12 | 1.96 | 2.15 |
| Wt % Ethylene | 97.7 | 98.6 | 98.7 | 100 | 100 | 100 | 0 |
| Vinyl/1000 C | 0.091 | 0.046 | 0.032 | 0.011 | 0.030 | 0.169 |  |
| Trisubstituted/ 1000 C | 0.502 | 0.241 | 0.134 | ND | ND | ND |  |
| Vinylidene/ 1000 C | 1.154 | 0.638 | 0.175 | ND | ND | 0.020 |  |
| Total Unsaturation/ 1000 C | 1.949 | 1.038 | 0.381 | 0.026 | 0.076 | 0.304 |  |

|  | H1[5]* | Polywax 500[2]* | C-80[6]* | A-C 9A[1]* | A-C 680A[7]* |
|---|---|---|---|---|---|
| Density (g/cc) | 0.960 | 0.920-0.930 | 0.920 | 0.930 | 0.930 |
| Melt Viscosity @ 140° C. (mPa · s) | 5 |  |  | 450 | 450 |
| Drop Point (° C.) | 112 |  | 88 | 115 | 108 |
| Tm (° C.) | >90° C. | 88 |  |  |  |
| Mw (g/mol) | 1,106 |  |  |  |  |
| Mn (g/mol) | 882 |  |  |  |  |
| Mz (g/mol) | 1,525 |  |  |  |  |
| Mw/Mn | 1.25 |  | 1.08 |  |  |
| Wt % Ethylene | 99.3 |  |  |  |  |
| Vinyl/1000 C | ND |  |  |  |  |
| Trisubstituted/ 1000 C | ND |  |  |  |  |
| Vinylidene/ 1000 C | ND |  |  |  |  |
| Total Unsaturation/ 1000 C | 0.003 |  |  |  |  |

*Comparative Wax
[1]Low density polyethylene homopolymer, Honeywell
[2]Polyethylene homopolymer, Baker Hughes
[3]Licocene ™ PE 4201, polyethylene wax-metallocene-catalyzed polyethylene wax, Clariant
[4]Licocene ™ PP 6102, polypropylene wax-metallocene-catalyzed polypropylene wax, white fine grain, Clariant
[5]SASOLWAX ™ H1, Fischer-Tropsch (FT) wax, Sasol Wax Company
[6]SASOLWAX ™ C-80, Fischer-Tropsch (FT) wax, Sasol Wax Company
[7]Oxidized polyethylene homopolymer, Honeywell The starting materials from Tables 2 and 3, a tackifier, and an antioxidant were weighed and then blended at 177° C. for 30 min at 100 rounds per minute (rpm) using a small bowl Haake blender. No visual separation was detected for any of the compositions. The compositions and their application performance data are provided in Table 4 below. The term "CS" denotes "comparative sample."

at a temperature from −40° C. to 60° C. Ex. 1, Ex. 2, and Ex. 3 are suitable for packaging applications. In contrast, compositions containing a PBPE and a Fischer-Tropsch wax (H1) (CS 5) exhibit a fiber tear less than 50% at a temperature from −40° C. to 60° C. and an open time less than 25 sec., indicating CS 5 is unsuitable for packaging applications.

TABLE 4

| Compositions+ | Ex. 1 | Ex. 2 | Ex. 3 | CS 1 | CS 2 | CS 3 | CS 4 | CS 5 |
|---|---|---|---|---|---|---|---|---|
| PBPE1[8] | 69.5 | 69.5 | 69.5 | 69.5 | 69.5 | 69.5 | 69.5 | 69.5 |
| A-C 1702 | 10 | — | — | — | — | — | — | — |
| A-C 617 | — | 10 | — | — | — | — | — | — |
| A-C 8 | — | — | 10 | — | — | — | — | — |
| Polywax 850* | — | — | — | 10 | — | — | — | — |
| Polywax 2000* | — | — | — | — | 10 | — | — | — |
| PE 4201* | — | — | — | — | — | 10 | — | — |
| PP 6102* | — | — | — | — | — | — | 10 | — |
| H1* | — | — | — | — | — | — | — | 10 |
| Tackifier (H-115W)[9] | 20.0 | 20.0 | 20.0 | 20.0 | 20.0 | 20.0 | 20.0 | 20.0 |
| AO[10] | 0.5 | 0.5 | 0.5 | 0.5 | 0.5 | 0.5 | 0.5 | 0.5 |
| Viscosity* @ 177° C. (mPa·s) | 1,287.23 | 1,409.70 | 1,585.00 | 1,250.00 | 1,357.00 | 1,255.00 | 1,415.00 | 1,170.00 |
| PAET (° C.) | 47.25 | 57.65 | 65.0 | 67.9 | 72.5 | 70.7 | 65.8 | 68.5 |
| PAFT Time (min.) | 34.50 | 55.30 | 69.8 | 75.8 | 85.0 | | 71.6 | 76.9 |
| Fiber Tear (%) −40° C. | 76 | 58 | 71 | 51 | 52 | 93 | 91 | 28 |
| 0° C | 71 | 65 | 76 | 35 | 63 | 82 | 96 | 27 |
| 23° C. | 96 | 93 | 91 | 78 | 80 | 96 | 100 | 62 |
| 60° C. | 98 | 99 | 100 | 96 | 100 | 99 | 94 | 94 |
| Open Time (sec.) | 39 | 30 | 27 | 21 | 24 | 30 | 32 | 22 |
| Set Time (sec.) | 9 | 9 | 3 | 2 | 2 | 2 | 8 | 3 |
| Fiber Tear (%) - −40° C. | 92 | | 95 | | | | 91 | |
| After 24 hrs −17° C. | 78 | | 85 | | | | 90 | |
| Aging @ 177° C. 0° C. | 78 | | 93 | | | | 86 | |
| 23° C. | 82 | | 100 | | | | 100 | |
| 60° C. | 80 | | 100 | | | | 99 | |
| Viscosity* @ 177° C. (mPa·s) - After 24 hrs Aging @ 177° C. | 1,272 | | 1,502 | | | | 1,380 | |
| Density Ratio ((propylene-based interpolymer of Comp. A)/(ethylene-based polymer of Comp. B)) | 1.01 | 0.97 | 0.95 | 0.92 | 0.91 | 0.91 | 0.98 | 0.92 |
| MWDp/MWDe Ratio ((propylene-based interpolymer of Comp. A)/(ethylene-based polymer of Comp. B)) | 1.26 | 1.16 | 1.17 | 2.05 | 2.03 | 1.16 | | 1.82 |

+Table 4 values are in weight percent, based on the total weight of the composition.
*Comparative Wax
*Viscosity of the composition.
[8]PBPE1, see above Table 2, The Dow Chemical Company
[9]Eastotac ™ H-115W hydrogenated hydrocarbon resin tackifier, Eastman; density = 1.04 g/cc; Ring-and-Ball softening point = 115° C.; melt viscosity at 190° C. = 400 mPa·s; Tg = 56° C.; form = flake; Mw = 950 g/mol; Mn = 450 g/mol; Mz = 2,100 g/mol; Mw/Mn = 2.1
[10]Irganox ®1010, Antioxidant pentaerythritol tetrakis(3-(3,5-di-tert-butyl-4-hydroxyphenyl)propionate), CAS 6683-19-8, BASF; density = 1.15 g/cc It is specifically intended that the present disclosure not be limited to the embodiments and illustrations contained herein, but include modified forms of those embodiments including portions of the embodiments and combinations of elements of different embodiments as come within the scope of the following claims.

We claim:

1. A composition comprising:
A) a propylene-based interpolymer having a density from 0.850 g/cc to 0.900 g/cc;
B) an ethylene-based polymer composition having a melt viscosity at 140° C. from 10 mPa·s to 1,000 mPa·s; and
C) a tackifier; and
the composition has a molecular weight distribution ratio from 1.00 to 1.40, wherein the molecular weight distribution ratio is the molecular weight distribution of the propylene-based interpolymer of component (A) to the molecular weight distribution of the ethylene-based polymer composition of component (B); and
the composition has a density ratio from 0.93 to 1.30, wherein the density ratio is the density of the propylene-based interpolymer of component (A) compared to the density of the ethylene-based polymer composition of component (B).

2. The composition of claim 1, wherein the ethylene-based polymer composition has a density from 0.880 g/cc to 0.930 g/cc and a molecular weight distribution from greater than 1.25 to 3.0.

3. The composition of claim 1, wherein the propylene-based interpolymer has a melt viscosity at 177° C. from 700 mPa·s to 10,000 mPa·s.

4. The composition of claim 1, wherein the propylene-based interpolymer has: (i) a density from 0.870 g/cc to 0.890 g/cc; (ii) a melt viscosity at 177° C. from 700 mPa·s to 5,000 mPa·s; (iii) a Koenig B-value less than 1.0; (iv) a total unsaturation per mole of propylene from 0.010% to 0.030%; and (v) a weight average molecular weight from 20,000 to 50,000 g/mol.

5. The composition of claim 1, the composition comprising:
(A) from 55 wt % to 90 wt % propylene-based interpolymer;
(B) from 1 wt % to 30 wt % ethylene-based polymer composition;

(C) from 5 wt % to 30 wt % tackifier; and (D) from 0.01 wt % to 1.0 wt % antioxidant.

6. The composition of claim 1, wherein the ethylene-based polymer composition has a melt viscosity at 140° C. from 20 mPa·s to 800 mPa·s.

7. The composition of claim 1, wherein the ethylene-based polymer composition has a molecular weight distribution from 1.5 to 2.0.

8. The composition of claim 1, wherein the composition has a melt viscosity at 177° C. from 300 mPa·s to 4,000 mPa·s.

9. The composition of claim 1, wherein the composition has: (i) a fiber tear from greater than 55% to 100% at a temperature from −40° C. to 60° C.; (ii) a peel adhesion failure temperature (PAFT) from 45° C. to 80° C.; (iii) a set time from 0.5 seconds to 9 seconds; and (iv) an open time from 25 seconds to 60 seconds.

10. An article comprising at least one component formed from the composition of claim 1.

* * * * *